United States Patent [19]
Chang

[11] 3,856,486
[45] Dec. 24, 1974

[54] PNEUMATIC PRESSURE CONTROL SYSTEM

[75] Inventor: Robert C. C. Chang, Sao Paulo, Brazil

[73] Assignee: Sun Oil Company of Pennsylvania, Philadelphia, Pa.

[22] Filed: Jan. 24, 1974

[21] Appl. No.: 436,262

[52] U.S. Cl. .................... 55/210, 137/85, 137/110
[51] Int. Cl. ........................................... G05d 16/00
[58] Field of Search ........ 55/21, 210, 270; 137/110, 137/85

[56] References Cited
UNITED STATES PATENTS

| | | | |
|---|---|---|---|
| 2,604,900 | 7/1952 | Hewitt | 137/110 |
| 2,819,774 | 1/1958 | Schmidt et al. | 55/210 |
| 3,501,899 | 3/1970 | Allen | 55/210 |

*Primary Examiner*—Bernard Nozick
*Attorney, Agent, or Firm*—Mr. George L. Church; Mr. Donald R. Johnson; Mr. Frank A. Rechif

[57] ABSTRACT

The pneumatic pressure at a load is maintained constant regardless of changes in the air supply pressure and in the air flow rate through the load by feeding back the load pressure and comparing it with a setpoint in a pressure regulator which is used to control the output pressure of a volume booster used to supply the load. To increase the system stability, minor loop signal feedback is utilized upstream of the load-varying element by way of a compensation network to the control coupling for the volume booster.

7 Claims, 2 Drawing Figures

PATENTED DEC 24 1974　　　　　　　　　3,856,486

3,856,486

PNEUMATIC PRESSURE CONTROL SYSTEM

This invention relates to a pneumatic pressure control system, and more particularly to an air supply pressure regulation system of high capacity. By way of example, the air supply which is regulated according to this invention may be used for fluidic circuit apparatus. In such apparatus, there is a load-varying element e.g., a filter, which causes the air flow rate through the load to vary with time, as the filter becomes clogged located between the air supply regulator and the actual load or, the final point where pressure regulation is required. For the pressure regulation, it is desirable to derive the feedback signal from the actual load.

Standard commercial regulators are usually limited to a flow capacity of 40 standard cubic feet per minute. For higher capacity apparatus, volume booster relays are often employed, such relays being fed from the air supply and being controlled by means of the regulator. Unfortunately, such a system would become unstable should the load-varying element (e.g., large capacity filter) cause excessive lag in the (feedback) system time response.

An object of this invention is to provide an improved high capacity pneumatic pressure control system.

Another object is to improve the stability of a feedback controlled air supply pressure regulation system.

A further object is to provide a pressure control system which utilizes less expensive components than many of the prior, known systems.

A still further object is to provide a novel high capacity, feedback controlled air supply pressure regulation system.

A detailed description of the invention follows, taken in conjunction with the accompanying drawing, wherein.

Figure 1:
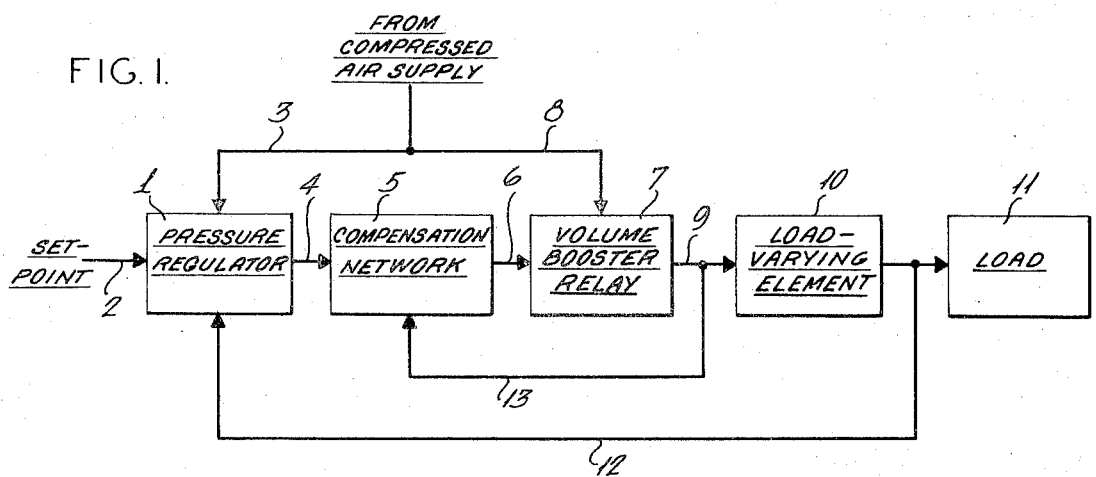
FIG. 1 is a block diagram of a system according to this invention.

Now referring to FIG. 1, a pressure regulator 1 of conventional type, having an adjustable setpoint as indicated at 2, receives air at 3 from a main compressed air supply (not shown) whose pressure may be varying in a fortuitous and entirely unpredictable manner. The output of the regulator 1 at 4 is fed through a stability compensation network 5 to the pressure control coupling 6 of a volume booster relay 7.

The volume booster relay 7 receives air at 8 from the main air supply previously referred to, and feeds output air by way of its coupling 9 through a load-varying element 10 to a load 11 (e.g., a fluidic circuit employing air). The flow rate of air through the load may vary from time to time, according to the demands of the load. The load-varying element 10 may for example be a large capacity filter, which acts like a variable resistor, variable say as it becomes clogged.

A main signal feedback coupling, denoted generally by numeral 12, extends from the load side of load-varying element 10 to the comparison coupling of the regulator 1. This feedback coupling is for feeding back the load pressure, and comparing it with the desired setpoint 2 in the regulator 1.

A minor signal feedback coupling, denoted generally by numeral 13, extends from the upstream side of the load-varying element 10 by way of the compensation network 5 to the control coupling 6 of the booster relay 7.

Figure 2:
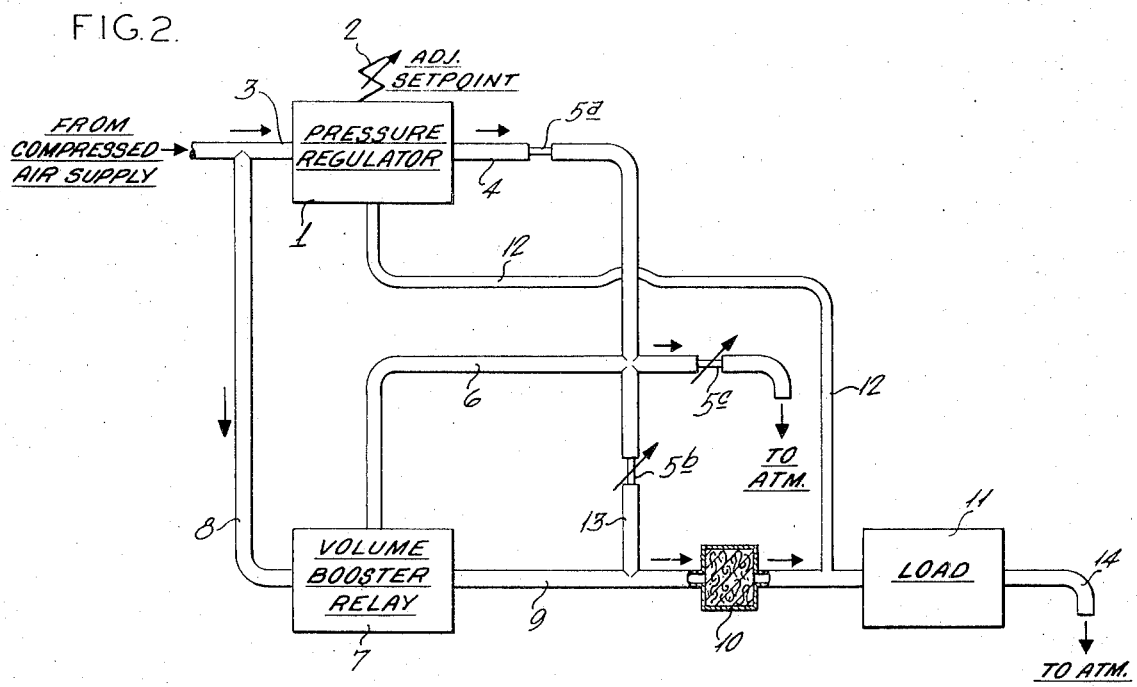
FIG. 2 is a detailed piping schematic illustrating the invention.

Now refer to FIG. 2, which is a rather detailed piping schematic illustrating the invention. In this figure, elements the same as those previously described are denoted by the same reference numerals.

The overall objective of the control system of the invention is to maintain the pressure at the load (i.e., the pressure at the downstream side of filter 10) constant, or substantially so, while the supply pressure (pressure in lines 3 and 8) and/or the load flowrate (considered at the "dead" or "exhaust" side of the load 11, at which side there is a pipe connection 14 coupled to a reference pressure such as atmosphere) are varying. This is accomplished by feeding back (by way of line 12) the load pressure to the pressure regulator 1, where it is compared with the desired setpoint. Any difference between the pressure (signal) so fed back and the setpoint pressure results in the production of an error signal.

The stability compensation network 5 comprises three restrictors (resistances) 5a, 5b, and 5c, two of which (to wit, 5b and 5c) are variable. The restrictors 5a–5c make up a pressure divider between the regulator output pressure (pressure in line 4) and the booster relay output pressure (pressure in line 9). Thus, the two resistors 5a and 5b are connected effectively in series between lines 4 and 9, and from the common junction point of these restrictors there is a coupling extending through the restrictor 5c to a pressure sump (atmosphere); the pressure control coupling 6 of booster relay 7 is connected at one end to the common junction of restrictors 5a, 5b, and 5c. In operation, restrictors 5b and 5c are adjusted to give the proper volume booster relay input pressure (pressure in line 6) for the anticipated ranges of changes in the supply pressure (in lines 3 and 8) and in the load flowrate.

Any error signal produced in regulator 1 (resulting from a comparison of the regulator setpoint with the load pressure) varies the volume booster relay input pressure (pressure in line 6) to control the booster relay output pressure (pressure in line 9) so that the pressure at the load 11 is maintained at the desired setpoint value.

It is pointed out that, in the system of this invention, the regulator 1 is used strictly as a comparator device in the feedback path, since the load flow takes place through the volume booster relay 7; since the flow requirement for the compensation network 5 is very small and nearly constant, the performance requirement on the regulator can be relaxed. Consequently, an inexpensive miniature model will suffice to render superior regulation with respect to varying load, compared to any other commercially available regulators which are used to carry the load directly.

Since the volume booster relay 7 is in the forward loop of the feedback path, its performance requirement can also be relaxed.

The system so far described in connection with FIG. 2, including the volume booster relay and the single (main) feedback loop, has a strong tendency to be unstable, since the large-capacity filter 10 causes excessive lags in the system time response. To provide a solution to the foregoing problem, the stability compensation network is implemented, as will now be described.

The system response is enhanced, thereby to obtain the desired stabilizing effect with the compensation network, by means of minor loop signal feedback denoted by 13 in FIG. 1. In FIG. 2, this feedback loop (again upstream of the load filter 10) includes the restrictor 5b (a portion of network 5) and the pressure control coupling 6 back to the volume booster relay 7.

The minor loop signal feedback compensates, in part, the lagging effect of the filter 10 on the total system response.

The control system of this invention can accommodate a wide range of system dynamic characteristics, due to the adjustments provided in the compensation network (variable resistances 5b and 5c).

The invention claimed is:

1. A pneumatic pressure control system for automatically controlling the pressure supplied to a load from an air supply, comprising a pressure regulator having a setpoint and arranged and connected to receive air from said air supply; a volume booster relay connected and receiving air from said air supply and supplying output air to a load, means connected to said regulator and relay for utilizing the output of said regulator to control the output pressure of said relay, and means connected adjacent said load to said regulator for feeding back a pressure signal from upstream said load to said regulator, for comparison with said setpoint to produce a signal.

2. System according to claim 1, including also a load-varying element connected between the output of said relay and said load.

3. System defined in claim 2, wherein the load-varying element comprises a filter for the output air supplied by said relay.

4. System set forth in claim 2, including also means for feeding back a pressure signal from the upstream side of said load-varying element to the output pressure control coupling of said relay.

5. System defined in claim 4, wherein the load-varying element comprises a filter for the output air supplied by said relay.

6. System defined in claim 4, wherein the last-mentioned feedback means includes a compensation network forming a pressure divider between the output of the regulator and the output pressure control coupling of the relay.

7. System defined in claim 4, wherein the last-mentioned feedback means includes a compensation network composed of a group of flow restrictors forming a pressure divider between the output of the regulator and the output pressure control coupling of the relay.

* * * * *